United States Patent
Stratton

(10) Patent No.: US 7,947,959 B2
(45) Date of Patent: May 24, 2011

(54) ENHANCED SENSITIVITY SOLID STATE RADIATION DETECTOR

(75) Inventor: Thomas George Stratton, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 270 days.

(21) Appl. No.: 12/427,313

(22) Filed: Apr. 21, 2009

(65) Prior Publication Data

US 2010/0264323 A1 Oct. 21, 2010

(51) Int. Cl.
*G01T 1/24* (2006.01)
*H01L 27/00* (2006.01)
*H01L 27/14* (2006.01)

(52) U.S. Cl. ............... 250/370.01; 250/208.1; 257/428

(58) Field of Classification Search ............ 250/370.01, 250/370.09, 370.12, 370.13, 208.1, 214.1; 257/428

See application file for complete search history.

(56) References Cited

U.S. PATENT DOCUMENTS

| | | | |
|---|---|---|---|
| 4,210,805 A | 7/1980 | Kobayashi et al. | |
| 4,689,649 A | 8/1987 | Sato et al. | |
| 4,926,052 A | 5/1990 | Hatayama et al. | |
| 4,942,442 A | 7/1990 | Bethea et al. | |
| 4,982,096 A | 1/1991 | Fujii et al. | |
| 4,996,432 A | 2/1991 | Saitou | |
| 5,420,452 A | 5/1995 | Tran et al. | |
| 7,196,333 B1 | 3/2007 | Gerstenmayer et al. | |
| 2004/0021060 A1* | 2/2004 | Ohkawa | 250/214.1 |
| 2006/0106306 A1 | 5/2006 | Essner et al. | |
| 2007/0235655 A1 | 10/2007 | Rhiger et al. | |
| 2010/0230578 A1* | 9/2010 | Horikoshi et al. | 250/208.1 |

FOREIGN PATENT DOCUMENTS

EP 1995608 11/2008

OTHER PUBLICATIONS

Schrimpf, Ron, "Radiation Effects on Emerging Electronic Materials and Devices", "available at http://www.isde.vanderbilt.edu/content/Schrimpf_MURI.ppt", 2005, Publisher: Vanderbilt University.

* cited by examiner

*Primary Examiner* — David P Porta
*Assistant Examiner* — Faye Boosalis
(74) *Attorney, Agent, or Firm* — Fogg & Powers LLC

(57) ABSTRACT

A solid state radiation detector comprises a substrate having a sensing element thereon and at least one heavy metal plug formed in at least one insulation layer above the substrate. The at least one heavy metal plug is located directly above the sensing element and is electrically isolated from the sensing element. The at least one heavy metal plug reacts with a plurality of initial radiation particles to produce a plurality of secondary particles, the plurality of secondary particles having a lower level of energy than the plurality of initial radiation particles; wherein the number of secondary particles produced is greater than the number of initial radiation particles with which the at least one heavy metal plug reacts; and wherein the sensing element is operable to produce an electrical signal in reaction to the secondary particles.

20 Claims, 3 Drawing Sheets

ENHANCED SENSITIVITY SOLID STATE RADIATION DETECTOR

BACKGROUND

There are various situations in which it is desirable to detect the presence of radiation. For example, a nation may wish to detect illicit radioactive material that is entering or leaving its borders because the radioactive material could pose a health and/or national security risk. Small, low-power radiation detectors are desired to aid border personnel in detecting the radioactive material. As the size and power requirements decrease, the ability of the border personnel to use the detector in varied situations increases. For example, a small hand-held detector could be used to facilitate the detection of illicit radioactive material at non-authorized border crossing locations since the small size makes the hand-held detector more portable than a larger radiation detector. Additionally, small, portable hand-held detectors could be used to inspect cargo without having to unload all the cargo and transport it to a larger detector.

However, decreasing the size and power requirements of a detector can also affect the sensitivity of the detector. For example, solid state germanium detectors have good sensitivity to radiation. However, germanium detectors typically require cooling, such as with liquid nitrogen. This requirement makes germanium detectors less practical for portable applications. Solid state silicon detectors typically require no cooling and are, thus, better-suited for small portable applications. However, silicon detectors are typically less efficient in sensing radiation than germanium detectors.

SUMMARY

In one embodiment, a solid state radiation detector is provided. The solid state radiation detector comprises a substrate having a sensing element thereon and at least one heavy metal plug formed in at least one insulation layer above the substrate. The at least one heavy metal plug is located directly above the sensing element and is electrically isolated from the sensing element. The at least one heavy metal plug reacts with a plurality of initial radiation particles to produce a plurality of secondary particles, the plurality of secondary particles having a lower level of energy than the plurality of initial radiation particles; wherein the number of secondary particles produced is greater than the number of initial radiation particles with which the at least one heavy metal plug reacts; and wherein the sensing element is operable to produce an electrical signal in reaction to the secondary particles.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
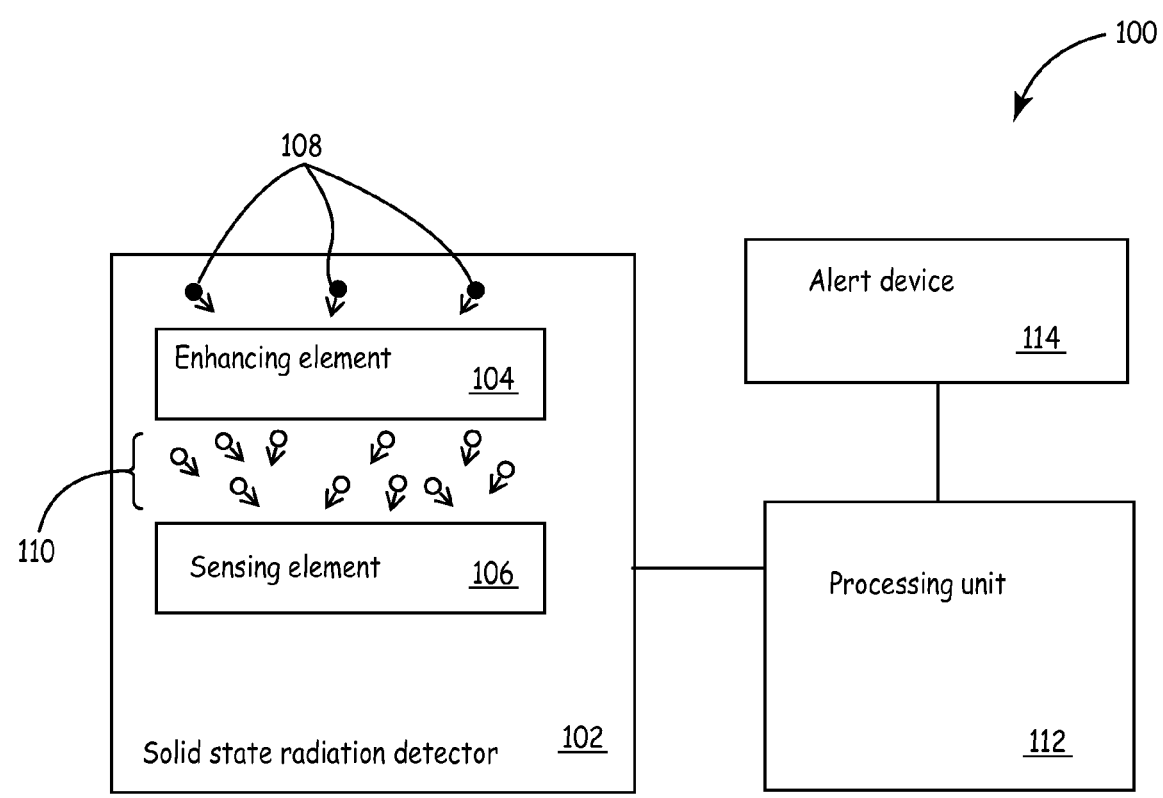
FIG. 1 is a block diagram depicting one embodiment of a radiation detection system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below provide a radiation detection system with enhanced sensitivity to radiation. The enhanced sensitivity improves detection rates of radioactive material in a wide range of solid state detectors implementing various types of semiconductor materials. However, it is to be understood that the level of improvement in detection rates or sensitivity is dependent on the semiconductor material used.

FIG. 1 is a block diagram of one embodiment of a radiation detection system 100 with enhanced sensitivity. System 100 can be implemented in different ways depending on the desired used. For example, system 100 can implemented as a portable hand-held, stand alone system or as a stationary system. Additionally, system 100 can be implemented in a space vehicle for detection of radiation in outer space.

System 100 includes a solid state radiation detector 102, a processing unit 112, and an alert device 114. Radiation detector 102 generates electrical pulses based on detected radiation particles. The electrical pulses are provided to the processing unit 112 which analyzes the pulses to detect the presence of radioactive material. For example, in one implementation, the processing unit 112 determines if the electrical pulses exceed a predetermined frequency or intensity threshold level. Once the threshold has been exceeded, the processing unit 112 provides a control signal to the alert device 114 to provide an alert to a user.

The processing unit 112 can be implemented using software, firmware, hardware, or any appropriate combination thereof, as known to one of skill in the art. For example, the processing unit 112 can include or interface with hardware components and circuitry that support the analysis of electrical pulses from the radiation detector to detect the presence of radioactive particles. By way of example and not by way of limitation, these hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA).

Additionally, the alert device 114 can be implemented as one or more of an audio device, a visual device, and/or a vibratory device. For example, in some implementations, alert device 114 provides an audio warning through the use of speakers or other audio device. The audio warning can be in the form of a single tone, a simulated voice, etc. In some embodiments, alert device 114 is implemented as a visual display such as, but not limited to, a liquid crystal display (LCD) for providing notice to a user of the detected radiation. Similarly, in some implementations, the alert device 114 is implemented with a light source such as a light emitting diode which emits a light when a signal is received from the processing unit 112. In some embodiments, the system 100 is a hand-held radiation detection system and the alert device 114 causes the system 100 to vibrate in order to alert the user to the detected radiation. It is to be understood that alert device 114 can be implemented as any type of device or combination of devices which provide a notice or warning to a user that radiation has been detected.

Solid state radiation detector 102 can be based on any appropriate type of semiconductor material including, but not limited to, germanium, silicon, cadmium telluride, mercuric iodide, and cadmium zinc telluride, etc. Solid state radiation detector 102 includes a sensing element 106 and an enhancing element 104. It is to be understood that radiation detector 102 may include other components not shown in FIG. 1. In addition, in some implementations, radiation detector 102 and processing unit 112 can be fabricated on the same semiconductor material (as shown in the exemplary embodiment of FIG. 2).

Sensing element 106 can be implemented as any appropriate component for transducing energy from radiation particles into electrical pulses. For example, in some embodiments, sensing element 106 is implemented as one or more solid state diodes. In other embodiments, sensing element 106 is implemented as one or more solid state transistors.

The enhancing element 104 interacts with radiation particles 108 having a first level of energy in the area around the radiation detection system 100 to produce more secondary particles 110 having a second, lower level of energy. The secondary particles 110 are then detected by the sensing element 106 which is located directly below the enhancing element 104. Since there are more secondary particles 110 than the original radiation particles 108, sensing element 104 is able to detect the presence of radiation more easily. In other words, the sensitivity of solid state radiation detector 102 is increased. Enhancing element 104 is comprised of a heavy metal, such as Tungsten, which has the property of interacting with radiation particles 108 to produce more secondary particles 110. An exemplary configuration of enhancing element 104 with respect to sensing element 106 is shown in FIG. 2.

Figure 2:
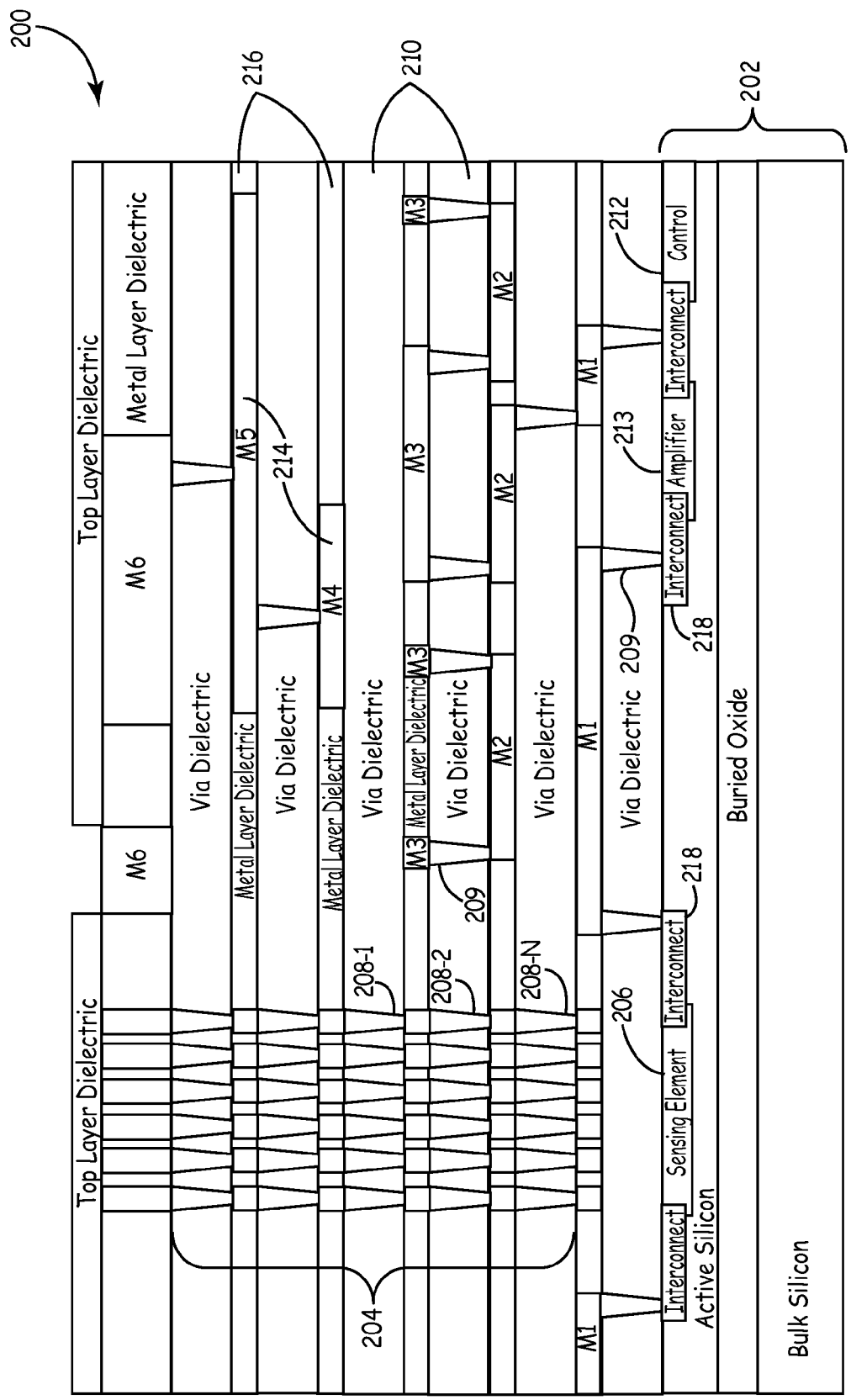
FIG. 2 is a partial cross-sectional side view of one embodiment of a solid state radiation detector.

FIG. 2 is a partial cross-sectional side view of one embodiment of a solid state radiation detector wafer 200. Solid state radiation detector 200 includes a substrate 202. In this embodiment, substrate 202 is comprised of silicon. However, it is to be understood that other materials can be used in other embodiments. In addition, although substrate 202 comprises a Silicon-on-insulator (SOI) starting material, it is to be understood that wafer 200 is not to be so limited.

Wafer 200 includes a sensing element 206, such as a diode or transistor, fabricated in the substrate 202. The sensing element 206 is fabricated during the part of the wafer fabrication process commonly referred to as the "Front end." For example, the sensing element 206 can be fabricated using processes such as, but not limited to, doped silicon processes, polysilicon processing, passivation processing, and contact processing.

Wafer 200 also includes a plurality of metal layers 216 and insulation layers 210 above the substrate 202. Although the exemplary embodiment in FIG. 2 comprises 6 metal layers, it is to be understood that other embodiments include other amounts of metal layers, such as 4 or 8, etc. At least one heavy metal plug 208 (also referred to as a via) is formed in an insulation layer 210 above the sensing element 206. In particular, the exemplary implementation shown in FIG. 2 includes a plurality of heavy metal plugs 208 in each of a plurality of insulation layers 210 above the sensing element 206. Packing the metal plugs 208 as close together in each insulation layer 210 increases the number of secondary particles provided to the sensing element 206. Additionally, stacking the metal plugs 208 in multiple insulation layers 210 as shown in FIG. 2, also increases the number of secondary particles provided to the sensing element 206. In particular, each layer of metal plugs 208 produces more secondary particles with lower energy than the previous layer. In other words, the multiple layers of metal plugs 208 provides a cascading effect in which more secondary particles are produced with each successive layer. In addition, with each successive layer, the level of energy of the secondary particles produced is lower. The multiple layers of metal plugs 208 comprise the enhancing element 204. As used herein, the term "secondary particles" refers to the particles produced by a heavy metal plug 208 in response to initial particles with which the plug 208 reacts. Thus, the secondary particles produced by plug 208-1 are the initial particles with which plug 208-2 reacts. Similarly, the secondary particles produced by plug 208-2 are the initial particles with which plug 208-N reacts.

Each of the heavy metal plugs 208 in this exemplary embodiment is comprised of Tungsten. However, other heavy metals can be used in other embodiments. Each of the heavy metal plugs 208 is also electrically isolated from the sensing element 206. The heavy metal plugs 208 can be fabricated using any appropriate techniques for fabricating standard electrical contact plugs such as plugs 209. Plugs 209 can also be made of a heavy metal, such as Tungsten. However, plugs 209 serve to provide electrical contact between metal layers 216 and devices on the substrate 202. For example, in this exemplary embodiment, an amplifier 213 and control logic 212 are fabricated on the substrate 202. The amplifier 213 amplifies the electrical signal from the sensing element 206 and the control logic 212 processes the amplified electrical signals to detect the presence of radiation. The control logic 212 and amplifier 213 are electrically coupled together and to the sensing element 206 via metal plugs 209 and local interconnects 218.

It is to be understood that the configuration of wafer 200 shown in FIG. 2 is provided by way of example and not by way of limitation. In particular, other configurations can be implemented in other embodiments. For example, in some embodiments, metal plugs 208 of enhancing element 204 do not extend through all the insulation layers 210 and metal layers 216 above sensing element 206. In some such embodiments, other metal plugs 209 and connections are then fabricated above the enhancing element 204. In an alternative implementation, the amplifier 213 is placed close to sensing element 206 with metal plugs 208 above. This grouping of amplifier 213 and sensing element 206 is then repeated in an array pattern and the control logic 212 is placed at the periphery of the array pattern.

Figure 3:
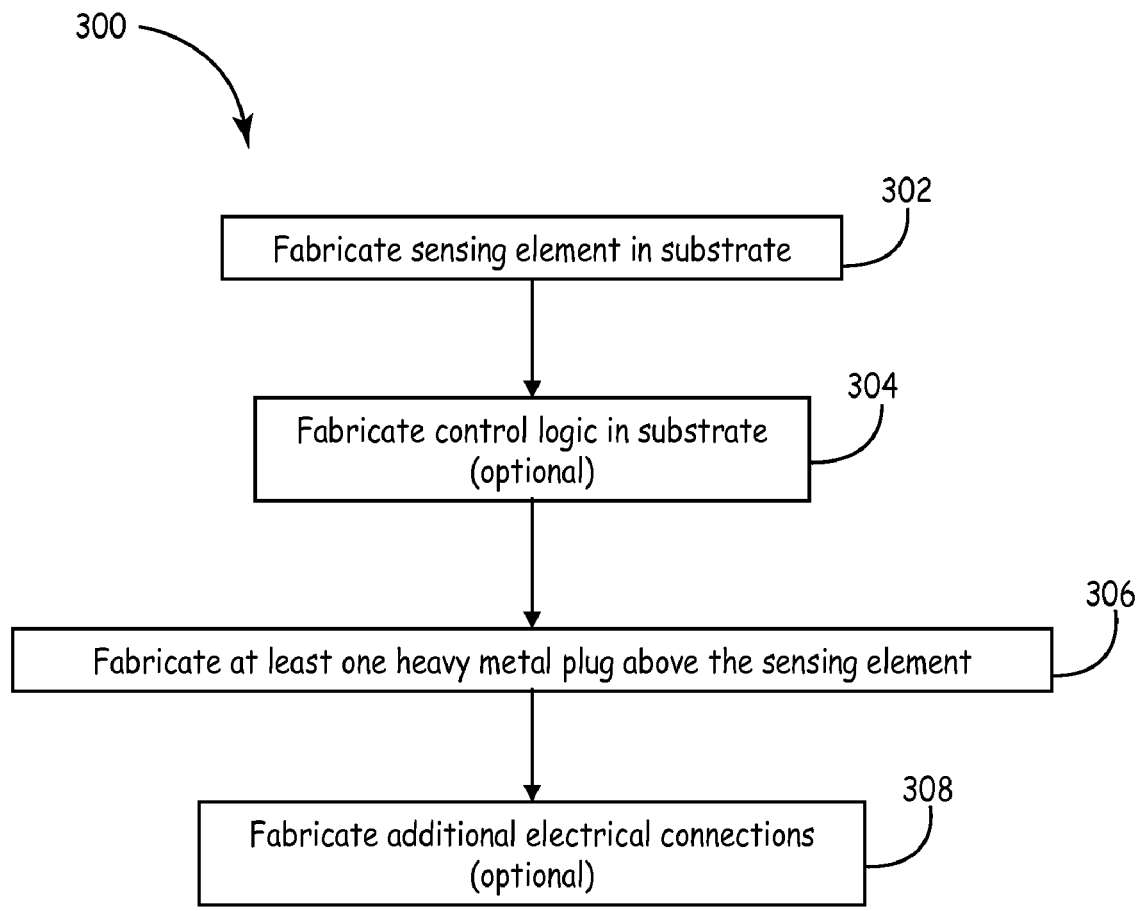
FIG. 3 is a flow chart depicting one embodiment of a method of manufacturing a solid state radiation detector.

FIG. 3 is a flow chart depicting a method 300 of fabricating a solid state radiation detector wafer, such as wafer 200 above. At block 302, a sensing element is fabricated in a substrate using known techniques, such as those discussed above. The sensing element is operable to transduce the energy of radiation particles into electrical signals. For example, the sensing element can be a diode or transistor as discussed above. At block 304, control logic is optionally fabricated on the same substrate as the sensing element as described above.

At block 306, at least one heavy metal plug is fabricated in an insulation layer above the sensing element using techniques known to one of skill in the art. The heavy metal plug is fabricated such that it is electrically isolated from the sensing element. The heavy metal plug is comprised of a metal, such as Tungsten, which interacts with radiation particles to generate more secondary particles having lower energy as described above.

In some embodiments, a plurality of heavy metal plugs are fabricated in a single insulation layer, each of the plurality of metal plugs located above and electrically isolated from the sensing element. Similarly, in some embodiments, a plurality of heavy metal plugs are fabricated in a plurality of insulation layers above the sensing element to form a stack of heavy metal plugs. Each layer of heavy metal plugs produces more secondary particles than the number of particles produces by the previous layer.

At block 308, additional connections are optionally formed in the metal and insulation layers using techniques known to one of skill in the art. For example, the same material used for the heavy metal plugs can be used for electrical connection plugs in other sections of the wafer. For example, an electrical connection between the sensing element and the control logic can be formed using electrical connection plugs and one or more metal layers. It is to be understood that method 300 is provided by way of example is not intended to limit the order in which the steps can be performed. For example, the optional electrical connections formed at block 308 can be formed at the same time or before as the heavy metal plugs at block 306. It is also to be understood that additional steps not discussed herein can be performed in other implementations.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A solid state radiation detector comprising:
a substrate having a sensing element thereon;
at least one heavy metal plug formed in at least one insulation layer above the substrate;
wherein the at least one heavy metal plug is located directly above the sensing element and is electrically isolated from the sensing element;
wherein the at least one heavy metal plug reacts with a plurality of initial radiation particles to produce a plurality of secondary particles, the plurality of secondary particles having a lower level of energy than the plurality of initial radiation particles;
wherein the number of secondary particles produced is greater than the number of initial radiation particles with which the at least one heavy metal plug reacts; and
wherein the sensing element is operable to produce an electrical signal in reaction to the secondary particles.

2. The solid state radiation detector of claim 1, wherein the sensing element is comprised of a diode or a transistor.

3. The solid state radiation detector of claim 1, wherein the at least one heavy metal plug is comprised of Tungsten.

4. The solid state radiation detector of claim 1, wherein the at least one heavy metal plug comprises a plurality of heavy metal plugs in the same insulation layer, each of the plurality of heavy metal plugs located directly above the sensing element and electrically isolated from the sensing element; wherein each of the plurality of heavy metal plugs reacts with a plurality of initial radiation particles to produce a plurality of secondary particles.

5. The solid state radiation detector of claim 1, wherein the at least one heavy metal plug comprises at least one heavy metal plug formed in each of a plurality of insulation layers, wherein the at least one heavy metal plug in each of the plurality of layers is formed directly above the sensing element.

6. The solid state radiation detector of claim 1, further comprising:

control logic formed on the substrate and coupled to the sensing element;
wherein the control logic is operable to process the electrical signal produced by the sensing element to detect radiation.

7. A solid state radiation detection system comprising:
an enhancing element operable to react with a plurality of initial radiation particles to produce a plurality of secondary particles, the plurality of secondary particles having a lower level of energy than the plurality of initial radiation particles, wherein the number of secondary particles produced is greater than the number of initial radiation particles with which the enhancing element reacts;
a sensing element formed on a substrate and located directly below the enhancing element, the sensing element operable to produce an electrical signal in reaction to the secondary particles;
a processing unit coupled to the sensing element and operable to process the electrical signal to detect radiation; and
an alert device operable to produce an alert in response to a signal from the processing unit when radiation is detected.

8. The solid state radiation detection system of claim 7, wherein the alert device is operable to produce one or more of an audio alert, a visual alert, and a vibratory alert.

9. The solid state radiation detection system of claim 7, wherein the solid state radiation detection system is a portable system.

10. The solid state radiation detection system of claim 7, wherein the enhancing element is comprised of a heavy metal plug formed in an insulation layer above the substrate.

11. The solid state radiation detection system of claim 10, wherein the heavy metal plug is comprised of Tungsten.

12. The solid state radiation detection system of claim 7, wherein the enhancing element is comprised of a plurality of heavy metal plugs formed in an insulation layer above the substrate, wherein each of the plurality of heavy metal plugs is located directly above the sensing element.

13. The solid state radiation detection system of claim 7, wherein the enhancing element is comprised of a plurality of heavy metal plugs in each of a plurality of insulation layers above the substrate, wherein each of the heavy metal plugs is located directly above the sensing element.

14. The solid state radiation detection system of claim 7, wherein the processing unit is formed on the substrate with the sensing element.

15. The solid state radiation detection system of claim 7, wherein the sensing element is a diode or a transistor.

16. A method of manufacturing a solid state radiation detector, the method comprising:
forming a sensing element in a substrate; and
forming at least one heavy metal plug directly above the sensing element in at least one insulation layer such that secondary particles produced by the at least one heavy metal plug in reaction to initial radiation are provided to the sensing element, the at least one heavy metal plug formed to be electrically isolated from the sensing element;
wherein the sensing element is operable to produce an electrical signal in response to the secondary particles.

17. The method of manufacturing the solid state radiation detector of claim 16, further comprising:

forming control logic in the substrate such that the control logic is electrically coupled to the sensing element, the control logic operable to process the electrical signals to detect radiation.

18. The method of manufacturing the solid state radiation detector of claim 16, wherein forming the at least one heavy metal plug comprises forming at least one Tungsten plug.

19. The method of manufacturing the solid state radiation detector of claim 16, wherein forming the at least one heavy metal plug comprises forming at least one heavy metal plug in each of a plurality of insulation layers, each of the at least one heavy metal plugs formed to be directly above the sensing element and to be electrically isolated from the sensing element.

20. The method of manufacturing the solid state radiation detector of claim 16, wherein forming the sensing element in a substrate comprises forming the sensing element in a silicon based substrate.

* * * * *